United States Patent
Chang et al.

(10) Patent No.: US 6,781,770 B1
(45) Date of Patent: Aug. 24, 2004

(54) ZOOM LENS SYSTEM

(75) Inventors: Kuo Wen Chang, Chung Ho (TW); Ming Liang, Tucson, AZ (US)

(73) Assignee: Nucam Corporation, Taipei (TW)

( * ) Notice: Subject to any disclaimer, the term of this patent is extended or adjusted under 35 U.S.C. 154(b) by 0 days.

(21) Appl. No.: 10/452,385

(22) Filed: Jun. 3, 2003

(51) Int. Cl.⁷ .............................................. G02B 15/14
(52) U.S. Cl. ..................... 359/689; 359/781; 359/784
(58) Field of Search ................. 359/689, 684, 359/676, 694, 683, 695, 699, 754, 781, 690, 737, 784–789, 791

(56) References Cited

U.S. PATENT DOCUMENTS

| | | | | |
|---|---|---|---|---|
| 5,353,163 A | * | 10/1994 | Shibayama et al. | 359/692 |
| 5,381,268 A | * | 1/1995 | Sato | 359/691 |
| 6,069,743 A | * | 5/2000 | Nagata et al. | 359/687 |
| 6,097,547 A | * | 8/2000 | Ogata et al. | 359/673 |
| 6,327,100 B1 | * | 12/2001 | Yamanashi | 359/689 |
| 6,342,975 B1 | * | 1/2002 | Yamanashi | 359/689 |
| 6,618,198 B1 | * | 9/2003 | Endo | 359/557 |
| 2003/0007256 A1 | * | 1/2003 | Usui et al. | 359/686 |
| 2003/0189762 A1 | * | 10/2003 | Mihara et al. | 359/680 |
| 2003/0197952 A1 | * | 10/2003 | Nozawa et al. | 359/689 |

* cited by examiner

*Primary Examiner*—Ricky Mack
*Assistant Examiner*—Brandi Thomas
(74) *Attorney, Agent, or Firm*—Rosenberg, Klein & Lee

(57) ABSTRACT

A zoom lens system comprises a first lens group having negative refractive power, a second lens group having positive refractive power, and a third lens group having positive refractive power. The first lens group includes a first lens unit having negative refractive power, which includes a negative lens and a negative lens having at least one aspherical surface, and a second lens unit including a positive lens. The second lens group includes an aperture element, a first lens unit having positive refractive power, which has a positive lens, a second lens unit having positive refractive power, which has a cemented positive lens including a positive lens and a negative lens, and a third lens unit having negative refractive power, which has a negative lens having at least one aspherical surface. The third lens group includes a positive lens plating with a multi-layer coating in the surface facing to the object side in order to cut off infrared rays and decrease the influence of infrared rays on image.

9 Claims, 6 Drawing Sheets

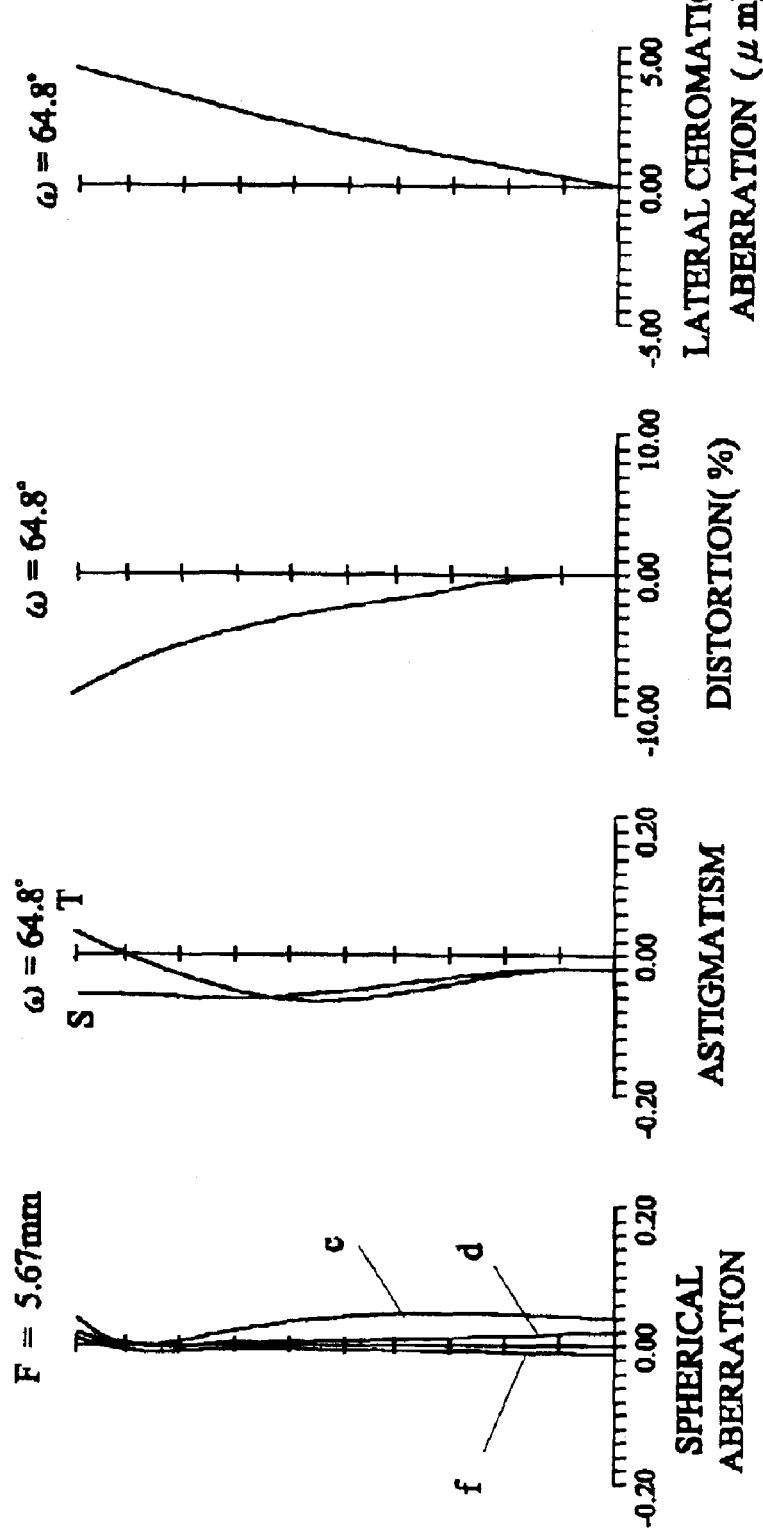

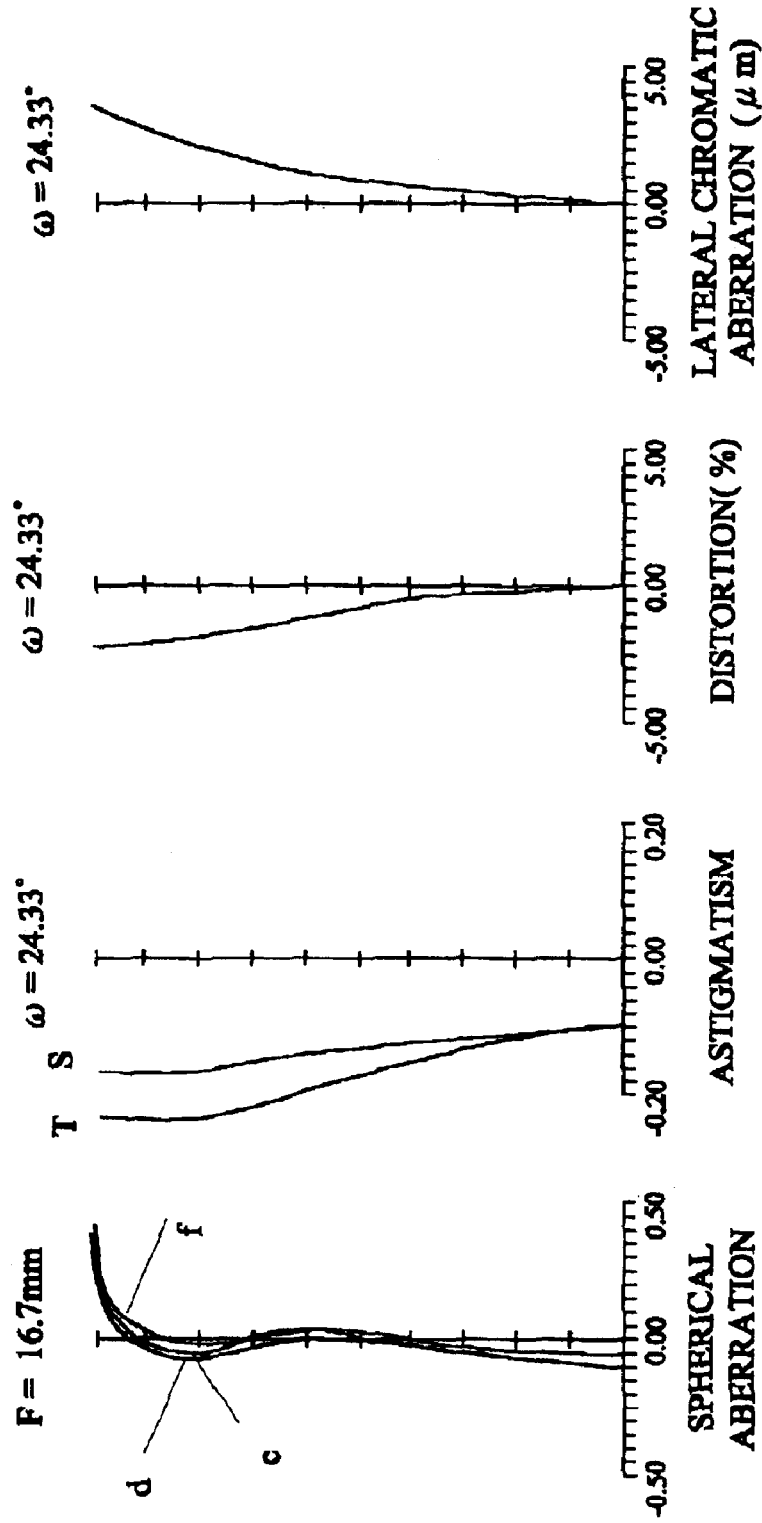

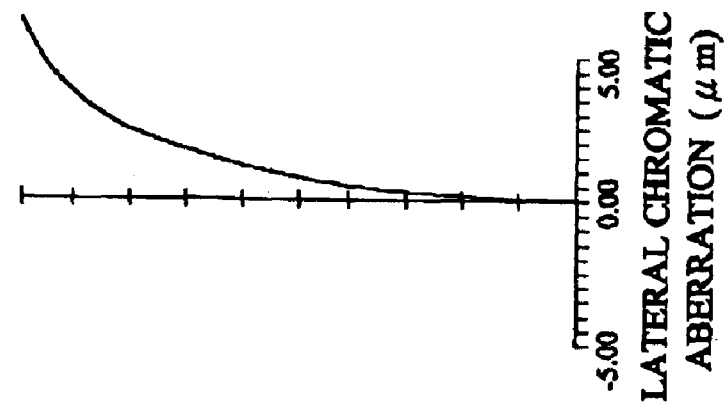
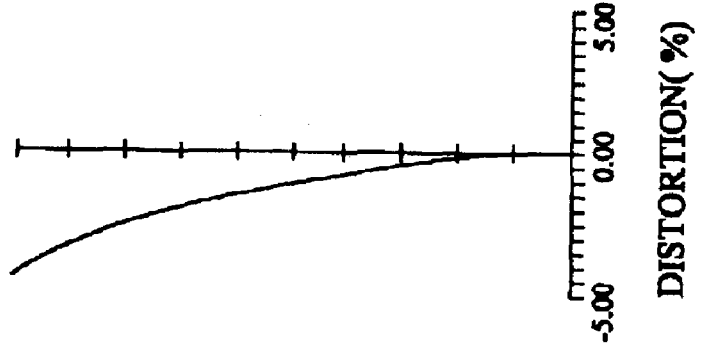
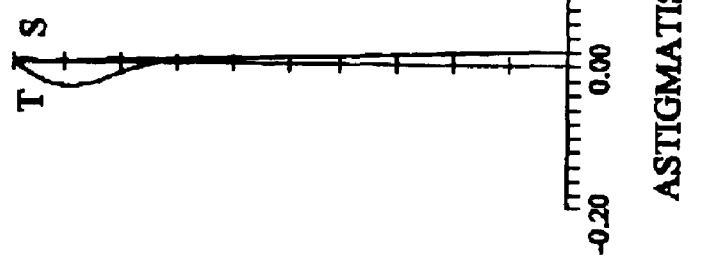
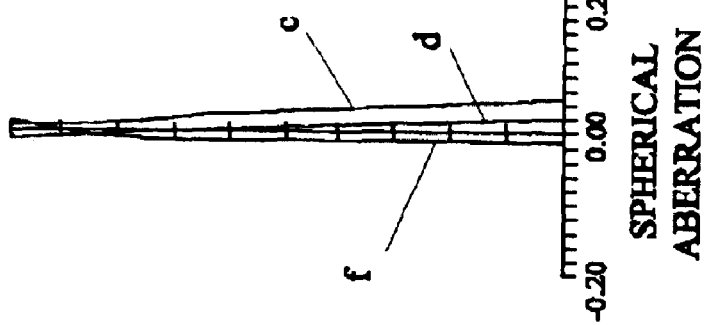

ZOOM LENS SYSTEM

BACKGROUND OF THE INVENTION

1. Field of the Invention

The invention generally relates to a zoom lens system which has a zoom ratio 3.0, and in particular to an digital camera and the like.

2. The Related Art

The traditional zoom lens system chiefly has two lens groups which are negative lens group and positive lens group. The zoom lens system generally has a zoom ratio about 2. It is obvious that the zoom ratio is too small, even the structure of the zoom lens system is simple. Further, the exit pupil distance of the lens system is too short. Especially, the illumination in the corner of image will be insufficient when applied to a digital camera and the like.

A zoom lens system is disclosed in U.S. Pat. No. 6,304,389, the zoom ratio is about 2.5. When it is applied in digital camera, the zoom ratio is still not sufficient. Further, the varied focal length lens system is comprises of three lens groups. When the focal length is changed, the three lens groups are moved respectively along the optical axis. Therefore, it is difficult to control the movement of the lens groups. Moreover, there is no design for cutting off infrared rays in the zoom lens system, the quality of image will be decreased.

SUMMARY OF THE INVENTION

An object of the present invention is to provide a zoom lens system which not only extends the exit pupil distance and improves the illumination in the corner of image, but also reduces the interference of infrared rays, in order to enhance the quality of image, simplify the structure, reduce the difficulty of controlling, and decrease the demands of manufacturing technology.

To achieve the above objective, the present invention provides a zoom lens system. In order from the object side, the zoom lens system comprises a first lens group having negative refractive power, a second lens group having positive refractive power and a third lens group having positive refractive power. The first lens group composes a first lens unit having negative refractive power and a second lens unit having positive refractive power, wherein the first lens unit includes a negative lens and a negative plastics lens having at least one aspherical surface, and the second lens unit includes a positive lens. The second lens group composes an aperture element, a first lens unit having positive refractive power, a second lens unit having positive refractive power and a third lens unit having negative refractive power, wherein the first lens unit includes a positive lens, the second lens unit is constructed by a cemented lens consisting of a positive lens and a negative lens, and the third lens unit includes a negative lens having at least on aspherical surface. The third lens group includes a positive lens unit with a multi-layer coating in the surface facing to the object side in order to cut off infrared rays and decrease the influence of infrared rays on image. Conventional infra red cut off filter is an additional piece. By designing a zoom lens we should reserve space to put the infra red cut off filter. If we use a multi-layer coating, which was integrated into a lens unit, the length of camera lens will become shorter. Since the third lens group is fixed, the exit pupil distance is extended and the illumination in the corner of image is improved. Further, there is lens having aspherical surface in the first lens group and the second lens group, as a result, excellent correction is made for various aberrations especially spherical aberration, coma astigmatism. Herewith a good imaging quality is obtained.

BRIEF DESCRIPTION OF THE DRAWING

The present invention will be apparent to those skilled in the art by reading the following description of embodiments thereof, with reference to the attached drawing, in which:

FIGS. 5A–5D show various aberration of the first embodiment of the present invention in the wide-angle end state.

FIGS. 6A–6D show various aberration of the first embodiment of the present invention in the telephoto end state.

FIGS. 7A–7D show various aberration of the second embodiment of the present invention in the wide-angle end state.

DETAILED DESCRIPTION OF THE PREFERRED EMBODIMENT

Figure 1:
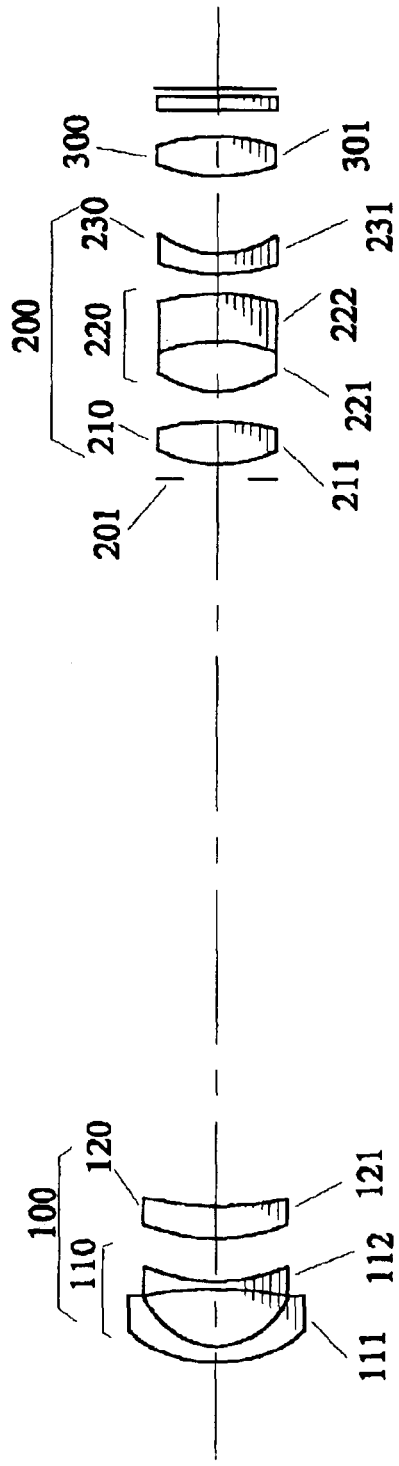
FIG. 1 is a view schematically showing first embodiment of the configuration of the zoom lens system of the present invention in the wide-angle end state.
Figure 2:
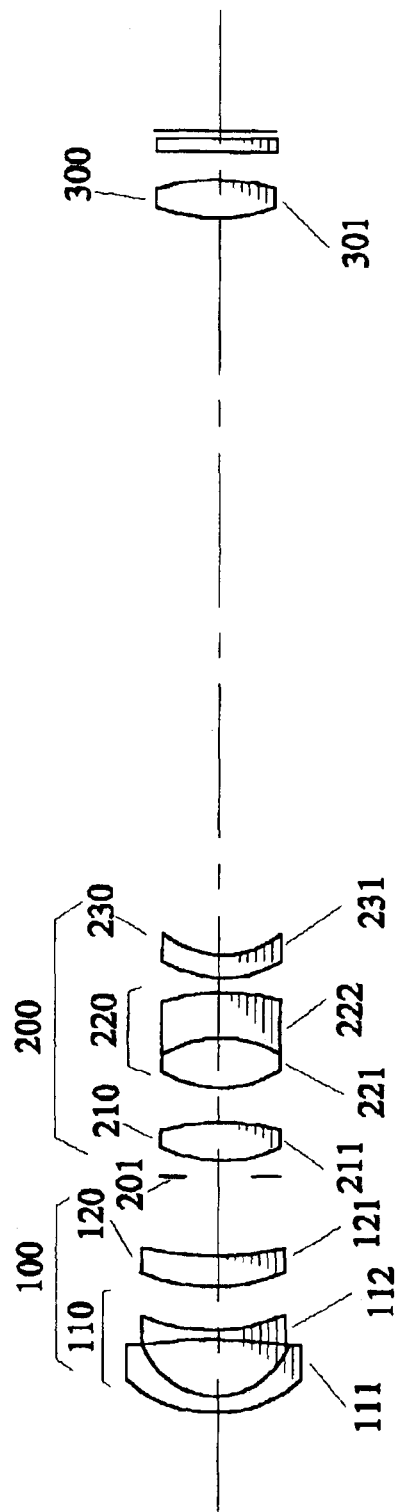
FIG. 2 is similar to FIG. 1 showing the zoom lens system in the telephoto end state.

With reference to FIG. 1 and FIG. 2, in order from the object side, a zoom lens system of the present invention comprises a first lens group 100 having negative refractive power, a second lens group 200 having positive refractive power and a third lens group 300 having positive refractive power. In order from the object side, light passes through the first lens group 100, the second lens group 200 and the third lens group 300 in turn.

The first lens group 100 comprises a first lens unit 110 having negative refractive power and a second lens unit 120 having positive refractive power. The first lens unit 110 includes a convex-concave negative lens 111 which the convex surface faces to the object side and a double concave negative plastics lens 112 having double aspherical surfaces. As a result, good correction of aberration can be accomplished, the quality of image is improved, the manufacturing difficulty of lens is decreased and the production costs is lower. The second lens unit 120 includes a positive meniscus lens 121 having a convex surface facing to the object side. The double concave negative plastics lens 112 and the positive meniscus lens 121 are applied to correct the aberration and the chromatic aberration of the convex-concave negative lens 111.

The second lens group 200 comprises an aperture element 201, a first lens unit 210 having positive refractive power, a second lens unit 220 having positive refractive power and a third lens unit 230 having negative refractive power. The first lens unit 210 includes a double convex positive lens 211. The second lens unit 220 constructs preferably a cemented lenses which are consisted of a double convex positive lens 221 and a concave-convex negative lens 222. The third lens unit 230 includes a convex-concave negative lens 231. Furthermore, it is preferable to introduce an aspherical to both side of the convex-concave negative lens 231, as a result, good correction of aberrations can be accomplished.

The third lens group 300 includes a double convex positive lens 301 plating with a multi-layer coating in the surface facing to the object side in order to cut off infrared rays for decreasing the influence of infrared rays on image and obtaining good imaging quality. The third lens group 300 is fixed in order to extend the exit pupil distance and improve the illumination in the corner of image. Furthermore, there is not a wave filter in the zoom lens system, so that the length of camera lens is shorter. The third lens group 300 is fixed and the first lens group 100 and the second lens group 200 are moved along the optical axis during zoom in order to change the magnification.

Based on the present invention, the first lens group 100 has three lenses arranged, in order from the object side, negative lens 111, negative lens 112 and positive lens 121. The first lens 111 is crown glass having high Abbe number. The second lens 112 has at least one aspherical surface and high Abbe number. The third lens 121 is flint glass. The first lens 112 and the second lens 121 can correct spherical aberration and chromatic aberration coming from the first lens 111. The second lens group 200 having is mainly focus group and includes four lenses. The first lens 211 and the second lens 221 are crown glass having high refractive index and Abbe number in order to decrease chromatic aberration. The fourth lens 231 has at least one aspherical surface. As a result, good correction of aberration is accomplished. The third lens group 300 includes a positive lens 301 plating with a multi-layer coating in the surface facing to the object side in order to cut off infrared rays and decrease the influence of infrared rays on image, so that good imaging quality is obtained, and the first lens group 300 is fixed in order to extend the exit pupil and improve the illumination in the corner of image. Further, there are lenses having aspherical surface in the first lens group 100 and the second lens group 200, as a result, the zoom lens system has less lenses and simpler structure. While the zoom ratio arrives 3.0, excellent correction is made for the various aberrations. Moreover, the lenses having aspherical surface don't touch directly with the outer surroundings, so that the lenses can be made of plastic, as a result, the cost of the zoom lens system is low and the structure is simple.

Figure 3:
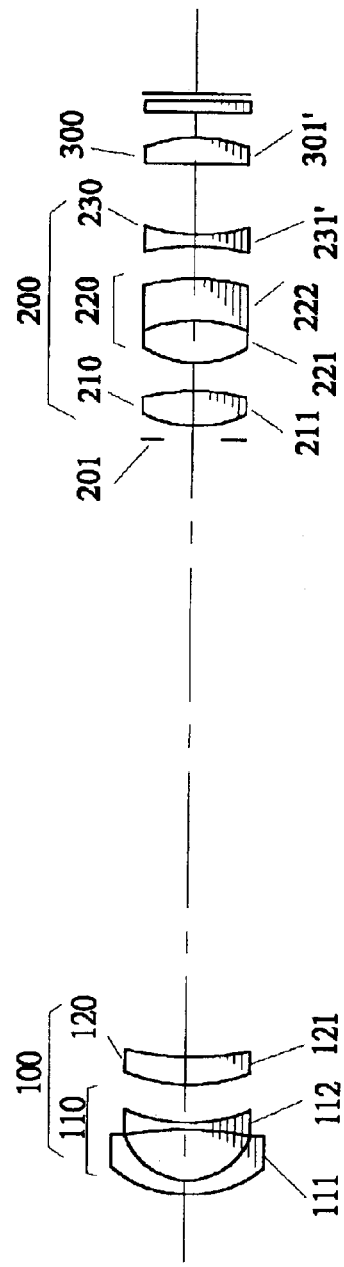
FIG. 3 is a view schematically showing second embodiment of the configuration of the zoom lens system of the present invention in the wide-angle end state.
Figure 4:
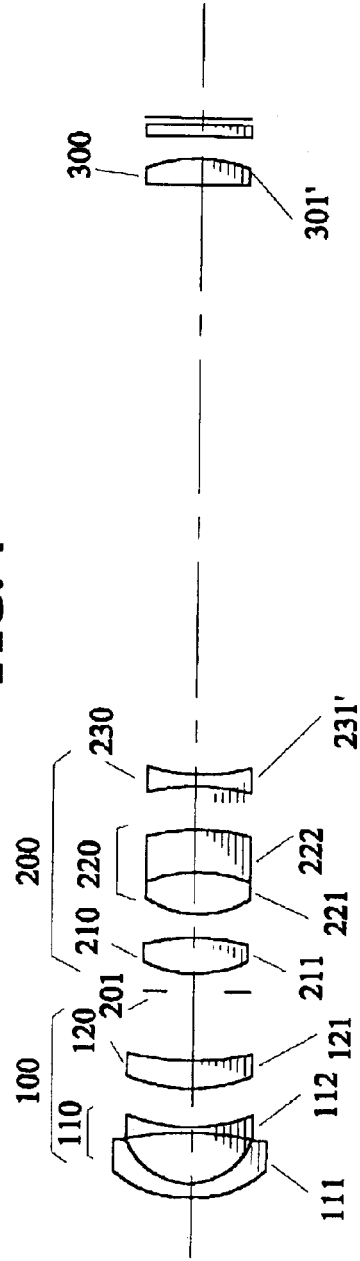
FIG. 4 is similar to FIG. 3 showing the zoom lens system in the telephoto end state.
Figures 8A, 8B, 8C, 8D:
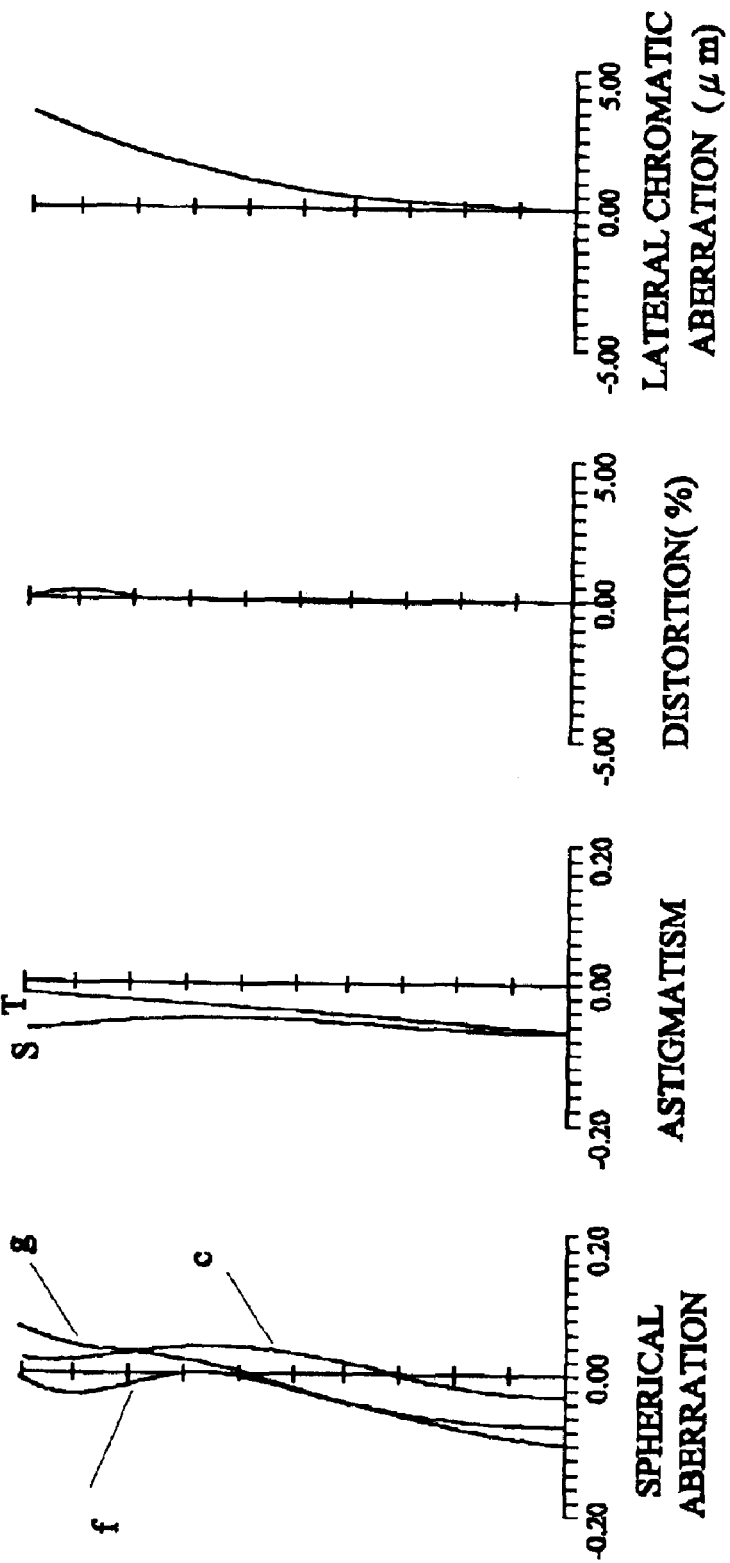
FIGS. 8A–8D show various aberration of the second embodiment of the present invention in the telephoto end state.

With reference to FIG. 3 and FIG. 4, a second embodiment which is similar to the first embodiment is shown. In the second embodiment, in order from the object side, the zoom lens system comprises first lens group 100, second lens group 200 and third lens group 300. The first lens group 100 comprises first lens unit 110 including a convex-concave negative lens 111 and a double concave plastics negative lens 112, and second lens group 120 including a meniscus lens 121. The second lens group 200 comprises an aperture element 201, first lens unit 210 including a double convex lens 211, second lens unit 220 including a double convex lens 221 and a concave-convex lens 222 and third lens unit 230 including a negative lens 231'. The third lens group 300 includes a positive lens 301'.

Further, the lens 231' has double concave surfaces, and it is preferable to introduce an aspherical plane to the both surfaces of the lens 231'. As a result, aberration of the zoom lens system can effectively be corrected.

Furthermore, the third lens group 300 includes a plane-convex positive lens 301' plating with a multi-layer coating in the surface facing to the object side in order to cut off infrared rays, decrease the influence of infrared rays on image and obtain good image quality. Moreover, the third lens group 300 is fixes in order to extend the exit pupil distance, so that the illumination in the corner of image can be improved. Since no wave filter is needed in the zoom lens system, the camera lens becomes shorter.

In each embodiment, the third lens group 300 is fixed, and the first lens group 100 and the second lens group 200 are moved respectively along the optical axis during zooming, as a result, the space between the first lens group 100 and the second lens group 200 is changed, at the same time, the following conditions:

$-2.7 < f1/fw < -1.7$ $1.7 < f2/fw < 2.2$ is satisfied, wherein f1 shows the effective focal length of the first lens group of the zoom lens system, f2 shows the effective focal length of the second lens group and fw shows the effective focal length of the zoom lens system in the wide-angle end state.

<First Embodiment>

FIG. 1 and FIG. 2 are schematic view of the first embodiment of the zoom lens system. In table 1, various values of the first embodiment are shown. In table 1, r shows radius of curvature of lens surface, d shows distance between lens surfaces, υ shows Abbe number, and n shows refractive index for d-line($\lambda$=587.6 nm) respectively. FIGS. 5A–5D and FIGS. 6A–6D show various aberrations of the first embodiment according to the zoom lens system in the wide-angle end state and in photo end state. In each aberration chart, F denotes the effective focal length, ω denotes angle of view, d denotes d-line($\lambda$=587.6 nm), c denotes c-line($\lambda$=656.3 nm), f denotes f-line($\lambda$=486.1 nm) respectively. Line S shows astigmatism in the sagittal image plane, and line T shows astigmatism in the tangential image plane. As is apparent from the respective diagrams showing the various aberrations, excellent correction is made for the various aberrations and good imaging quality is obtained.

TABLE 1

| | r | d | υ | n | |
|---|---|---|---|---|---|
| 1 | 15.663 | 1 | 41.01 | 1.88067 | |
| 2 | 7.334 | 2.527 | | | |
| 3 | −64.490 | 0.598 | 57.44 | 1.49176 | aspherical |
| 4 | 9.266 | 2.405 | | | aspherical |
| 5 | 12.708 | 2.5 | 23.83 | 1.84667 | |
| 6 | 28.415 | 18.433 | | | |
| 7 | ∞ | 0.993 | | | aperture element |
| 8 | 15.451 | 2 | 46.38 | 1.80318 | |
| 9 | −117.146 | 0.93 | | | |
| 10 | 8.075 | 2.5 | 84.47 | 1.48656 | |
| 11 | −8.075 | 2.2 | 35.83 | 1.66446 | |
| 12 | −19.193 | 0.564 | | | |
| 13 | 13.003 | 0.6 | 29.91 | 1.58547 | aspherical |
| 14 | 4.827 | 8.614 | | | aspherical |
| 15 | 39.959 | 2.5 | 41.01 | 1.88067 | |
| 16 | −55.542 | | | | |

<Second Embodiment>

FIG. 3 and FIG. 4 are schematic view of the second embodiment of the zoom lens system. In table 2 various values of the second embodiment are shown, the similar symbols have been shown in the first embodiment.

FIGS. 7A–7D and F FIGS. 8A–8D show various aberrations of the second embodiment according to the zoom lens system in the wide-angle end state and in the telephoto end state. In each aberration chart, the similar symbols have been shown in the first embodiment. As is apparent from the respective diagrams showing the various aberrations, excellent correction is made for the various aberrations and good imaging quality is obtained.

TABLE 2

| | r | d | υ | n | |
|---|---|---|---|---|---|
| 1 | 21.435 | 1 | 40.8 | 1.88300 | |
| 2 | 7.433 | 2.054 | | | |
| 3 | −34.090 | 1 | 56.10 | 1.53117 | aspherical |
| 4 | 23.746 | 2.614 | | | aspherical |
| 5 | 13.417 | 2 | 23.8 | 1.84666 | |
| 6 | 30.387 | 20.413 | | | |
| 7 | ∞ | 1 | | | aperture element |
| 8 | 8.692 | 1.327 | 46.5 | 1.80420 | |
| 9 | 94.293 | 0.955 | | | |
| 10 | 8.917 | 2.2 | 70.4 | 1.48749 | |
| 11 | −8.917 | 1.2 | 25.5 | 1.80518 | |
| 12 | −36.318 | 0.315 | | | |
| 13 | −8.909 | 1.2 | 29.91 | 1.58547 | aspherical |
| 14 | 80.337 | 6.612 | | | aspherical |
| 15 | ∞ | 2 | 40.8 | 1.88300 | |
| 16 | −26.201 | | | | |

As described above, the present invention makes it possible to provide a zoom lens system having a zoom ratio about 3.0, simple structure, easy control, the lower demands of manufacturing technology, and an excellent imaging quality, which is suited for use with a digital camera and the like.

What is claimed is:

1. A zoom lens system, in order from the object side, comprising:
a first lens group having negative refractive power;
a second lens group having positive refractive power; and
a stationary third lens group having positive refractive power;
the first lens group including:
a first lens unit having negative refractive power, the first lens unit including a convex-concave negative lens and a double concave negative lens disposed adjacent thereto, the double concave negative lens having at least one aspherical surface; and
a second lens unit including a positive lens having a convex surface facing the object side;
the second lens group including:
an aperture element;
a first lens unit having positive refractive power, the first lens unit including a positive lens;
a second lens unit having positive refractive power, the second lens unit including a positive lens and a negative lens; and
a third lens unit having positive refractive power, the third lens unit including a positive lens having at least one aspherical surface; and
the third lens group including a positive lens.

2. The zoom lens system as claimed in claim 1, wherein the second lens unit of the second lens group is constructed by a cemented lens including two lenses.

3. The zoom lens system as claimed in claim 1, wherein the third lens unit of the second lens group includes a convex-concave lens.

4. The zoom lens system as claimed in claim 1, wherein the third lens unit of the second lens group includes a double concave lens.

5. The zoom lens system as claimed in claim 1, wherein a condition $-2.7<f1/fw<-1.7$ is satisfied, where f1 denotes the effective focal length of the first lens group of the zoom lens system, and fw denotes the effective focal length of the zoom lens system in the wide-angle end state.

6. The zoom lens system as claimed in claim 1, wherein a condition $1.7<f2/fw<2.2$ is satisfied, where f2 denotes the effective focal length of the second lens group, and fw denotes the effective focal length of the zoom lens system in the wide-angle end state.

7. The zoom lens system as claimed in claim 1, wherein the third lens group includes a plane-convex lens.

8. The zoom lens system as claimed in claim 1, wherein the third lens group includes a double convex lens.

9. The zoom lens system as claimed in claim 1, wherein the third lens group includes a positive lens having a multi-layer coating formed on a surface thereof facing to the object side.

* * * * *